(12) United States Patent
Bedel

(10) Patent No.: US 11,083,123 B2
(45) Date of Patent: Aug. 10, 2021

(54) MULTI-PURPOSE AGRICULTURAL IMPLEMENT

(71) Applicant: Ambrose M. Bedel, Greensburg, IN (US)

(72) Inventor: Ambrose M. Bedel, Greensburg, IN (US)

(*) Notice: Subject to any disclaimer, the term of this patent is extended or adjusted under 35 U.S.C. 154(b) by 57 days.

(21) Appl. No.: 16/040,728

(22) Filed: Jul. 20, 2018

(65) Prior Publication Data

US 2019/0021209 A1    Jan. 24, 2019

Related U.S. Application Data

(60) Provisional application No. 62/534,974, filed on Jul. 20, 2017.

(51) Int. Cl.
| | |
|---|---|
| *A01B 63/32* | (2006.01) |
| *A01C 7/00* | (2006.01) |
| *A01C 7/20* | (2006.01) |
| *A01C 5/06* | (2006.01) |
| *A01B 49/02* | (2006.01) |

(52) U.S. Cl.
CPC ............. *A01B 63/32* (2013.01); *A01C 7/006* (2013.01); *A01C 7/208* (2013.01); *A01B 49/02* (2013.01); *A01C 5/062* (2013.01)

(58) Field of Classification Search
CPC ........... A01C 5/062; A01C 5/064; A01C 5/06; A01C 7/006; A01C 7/201; A01C 7/208; A01B 33/00; A01B 33/02; A01B 33/14; A01B 33/142; A01B 33/16; A01B 49/02; A01B 49/04; A01B 49/06; A01B 59/04; A01B 59/042; A01B 59/043; A01B 59/066; A01B 63/008; A01B 63/10; A01B 63/118; A01B 63/24; A01B 63/32; A01B 63/02; A01B 63/048; A01B 63/22; A01B 79/005; A01B 79/02

See application file for complete search history.

(56) References Cited

U.S. PATENT DOCUMENTS

| | | | | |
|---|---|---|---|---|
| 3,701,327 A | * | 10/1972 | Krumholz | ............. A01C 7/006 111/81 |
| 4,187,914 A | * | 2/1980 | van der Lely | ......... A01B 11/00 172/102 |
| 4,696,349 A | * | 9/1987 | Harwood | ............... A01B 63/22 172/323 |

(Continued)

*Primary Examiner* — Alicia Torres
(74) *Attorney, Agent, or Firm* — Dunlap Bennett & Ludwig, PLLC; Brendan E. Squire

(57) ABSTRACT

A multiple use toolbar attachment for an agricultural implement to tiller to enhance seed planting and row making. The toolbar converts the agricultural implement between a tilling implement and a planting implement in "one-step" by rotation of the toolbar about a longitudinal axis. A plurality of implement mounting brackets are disposed in a spaced apart relation along the longitudinal length of the tool bar. A forward mounting bracket is adapted to receive a first implement and an aft mounting bracket is adapted to receive a second implement. Rotation of the toolbar selectively positions one of the first implement or the second implement to treat the ground surface. The multiple use toolbar may be coupled to another implement, such as a tiller, for tandem operation with the another implement.

19 Claims, 4 Drawing Sheets

(56) References Cited

U.S. PATENT DOCUMENTS

| | | | | |
|---|---|---|---|---|
| 5,406,897 | A * | 4/1995 | Pingry | A01C 7/042 |
| | | | | 111/52 |
| 5,797,460 | A * | 8/1998 | Parker | A01B 13/08 |
| | | | | 172/151 |
| 8,430,179 | B2 * | 4/2013 | Van Buskirk | A01B 29/048 |
| | | | | 172/166 |
| 9,107,337 | B2 * | 8/2015 | Bassett | A01B 71/02 |
| 10,251,324 | B2 * | 4/2019 | Martin | A01C 7/006 |
| 10,412,881 | B1 * | 9/2019 | Houck | G05D 1/0219 |
| 2014/0048001 | A1 * | 2/2014 | Bassett | A01C 7/205 |
| | | | | 111/59 |
| 2015/0230391 | A1 * | 8/2015 | Houck | A01B 79/005 |
| | | | | 701/50 |
| 2016/0183446 | A1 * | 6/2016 | Achten | A01B 49/02 |
| | | | | 172/2 |

* cited by examiner

MULTI-PURPOSE AGRICULTURAL IMPLEMENT

CROSS-REFERENCE TO RELATED APPLICATION

This application claims the benefit of priority of U.S. provisional application No. 62/534,974, filed Jul. 20, 2017, the contents of which are herein incorporated by reference.

BACKGROUND OF INVENTION

The present invention relates to agricultural implements drawn behind a ground transport vehicle, such as a tractor, and more particularly to an agricultural implement that performs a plurality of roles without detachment from the ground transport vehicle.

When planting a garden the tiller works the ground to make good for planting. Then the tiller, which uses a 3-point hitch on the tractor, has to be removed from the tractor in order to attach another implement, such as a seeder, which requires use of that same 3-point hitch. During planting, the soil gets compacted tightly again from the tractor running over it in order to plant with the seeders.

The tractor using the tiller has only one 3-point hitch and typically, the tiller requires its use. A second 3-point hitch, attached to the tiller, would allow the planting and tilling in one pass. The planter and seeder can be raised and lifted out of the soil until the tiller has worked the soil so that it ready for planting.

As can be seen, there is a need for a. tilling and planting apparatus that allows for a "one-step" operation that works the soil and plants it at the same time. The tractor does not need to drive over the newly tilled soil to plant. Also time is saved because the tiller does not have to be removed in order to attach the seeders. The condition of the soil can be planted without tracks, providing a full seed bed tilled area.

SUMMARY OF THE INVENTION

In one aspect of the invention, a multipurpose farm implement is disclosed. The multipurpose farm implement has an elongate tool bar having a longitudinal length that is disposed transversely to a direction of travel of the multipurpose farm implement across a ground surface. A plurality of implement mounting brackets are disposed in a spaced apart relation along the longitudinal length of the tool bar. The plurality of mounting brackets include a forward mounting bracket adapted to receive a first implement and an aft mounting bracket adapted to receive a second implement. A rotational bracket is coupled to the tool bar. The rotational bracket is configured to be coupled to a rotational actuator to selectively position one of the first implement or the second implement in a working position over the ground surface.

In some embodiments, the first implement comprises a furrow and the second implement comprises a seeder.

The multipurpose farm implement includes an implement brace bar formed in an inverted Y-shape. A mounting bracket extends from a forward end of the tool bar, wherein lower ends of the implement brace attach to the mounting bracket. The multipurpose farm implement may also include a forward brace bar formed in an inverted Y-shape and configured to attach to a 3 point hitch. A lower lift arm interconnects a lower end of the forward brace bar and the lower end of the implement brace bar.

In some embodiments, a connecting rod may interconnect an upper end of the forward brace and an upper end of the implement brace. A lift actuator is interconnected between an intermediate portion of the forward brace and an intermediate portion of the implement brace. The lift actuator is operable to elevate the multipurpose farm implement to a non-working position and lower the multipurpose farm implement to a working position.

In yet other embodiments, a depth control chain is attached between the upper end of the forward brace and the intermediate portion of the implement brace. The depth control chain adjustably limits the travel of the apparatus as it is lowered to the working position.

In certain embodiments, a cross bar extends between the lower lift arm and a cylinder mount is attached to the cross bar. The cylinder mount is attached to a forward end of the rotational actuator.

The rotational bracket may include a rotational cylinder mount arm radially extending from the rotational bracket. An aft end of the rotational actuator is attached to the rotational cylinder mount arm. The rotational bracket may also include an arcuate slot defined in a face of an indexing plate coupled to the rotational bracket. An index pin protrudes within the arcuate slot, wherein the arcuate slot defines a clockwise rotational limit and a counter clockwise rotational limit of the multipurpose farm implement. The tool bar may be rotationally carried in an aperture defined in the indexing plate.

In yet other embodiments of the invention, the multipurpose farm implement may also include a tiller. A lug protrudes from a lower end of the tiller and the lower ends of the front brace are coupled to the lugs. A tandem link interconnects a top end of the tiller and a top end of the front brace to couple the multipurpose farm implement to the tiller in a tandem three point hitch configuration.

These and other features, aspects and advantages of the present invention will become better understood with reference to the following drawings, description and claims.

DETAILED DESCRIPTION OF THE INVENTION

Figure 1:
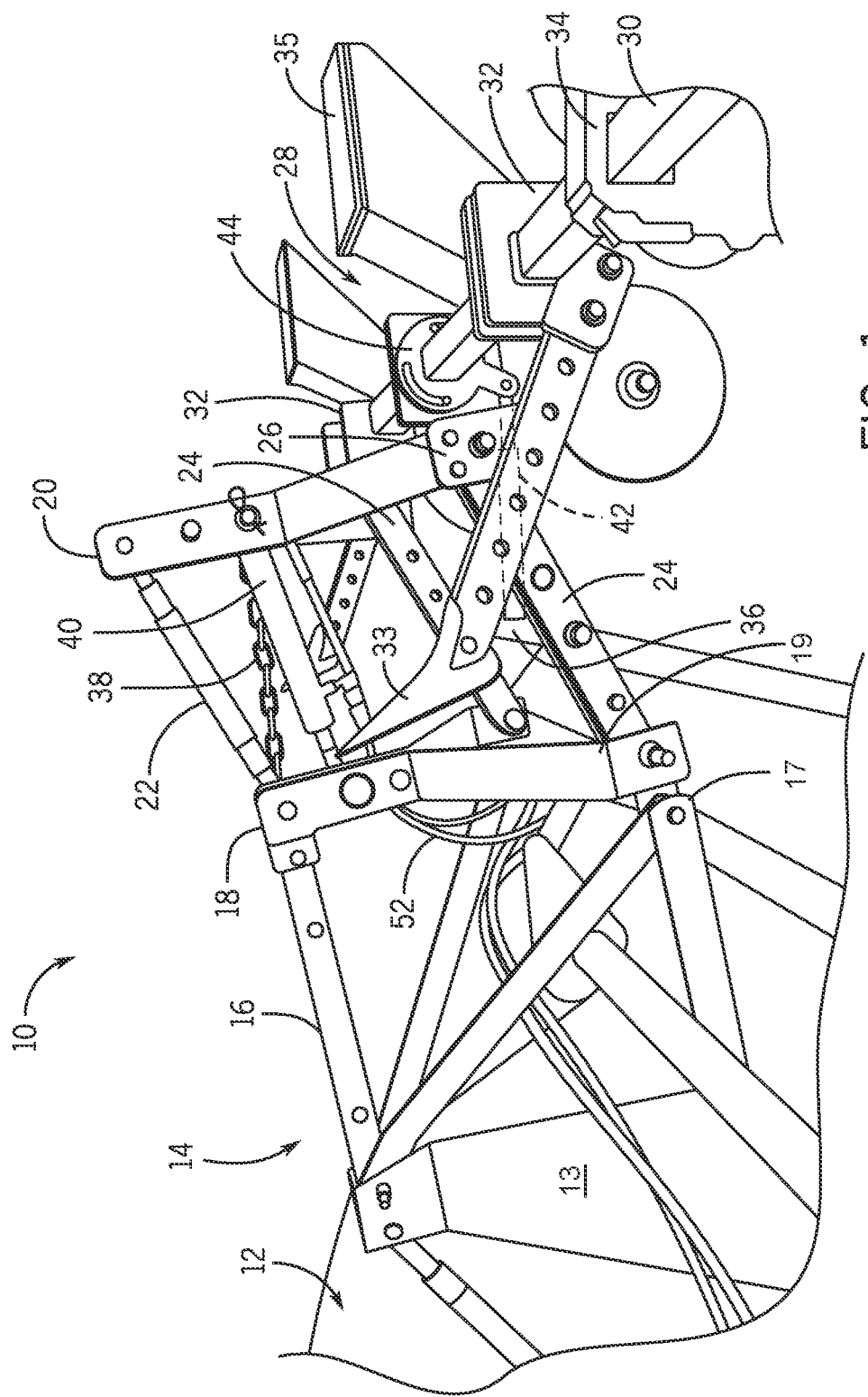
FIG. 1 is a perspective view of the multipurpose agricultural implement.
Figure 2:
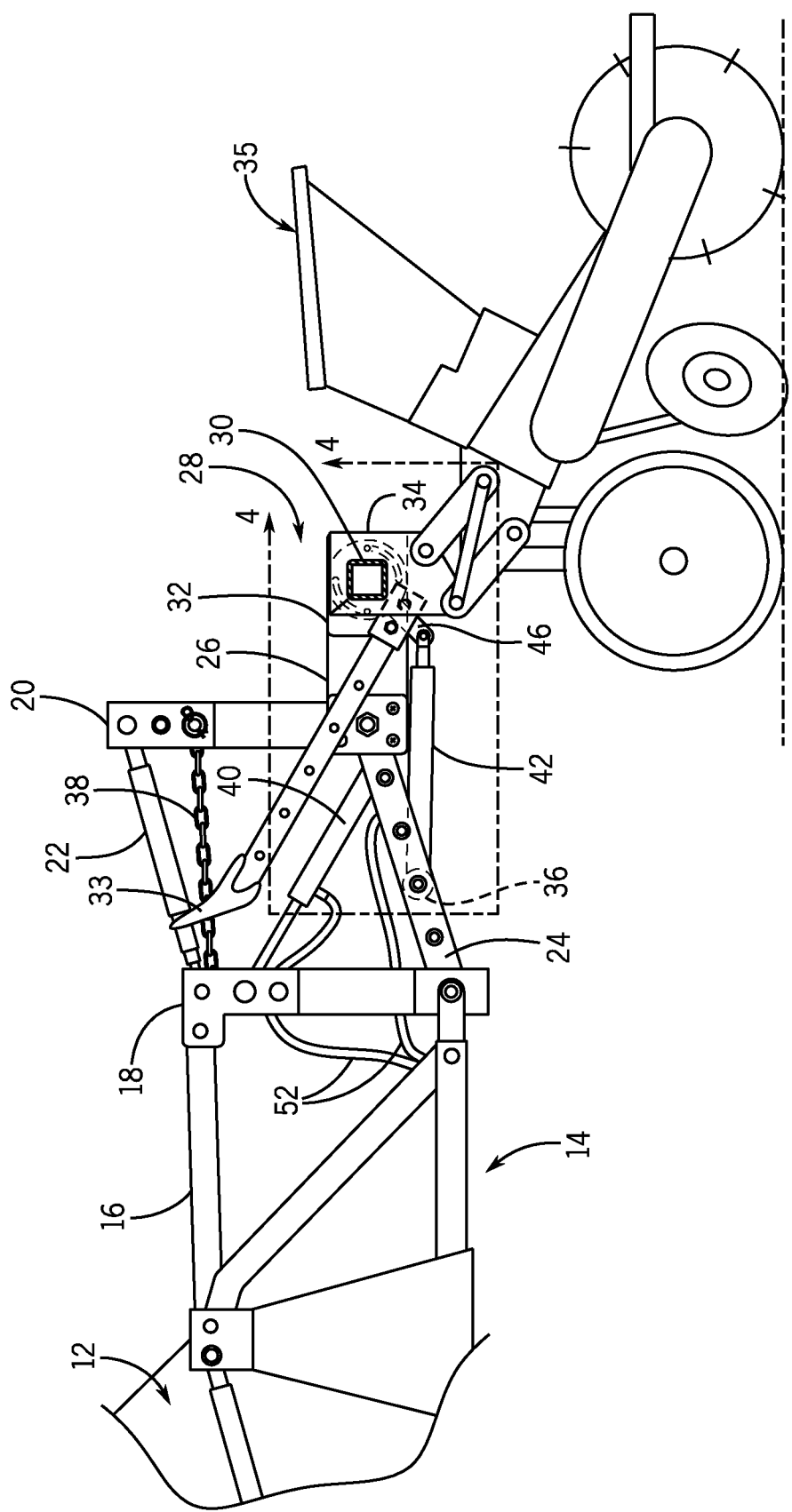
FIG. 2 is a side elevation view of the multipurpose agricultural implement with the seeder in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a three-point hitch for tandem operation of an agricultural implement and a multi-purpose agricultural implement. The three point hitch allows "single pass" planting and tillage.

The multi-purpose agricultural implement permits easy conversion between a seeder and a row making implement.

As shown in the accompanying figures, a 3-point hitch attachment 14 permits a tandem connection to an agricultural implement 13, such as a tiller apparatus, that is drawn by the three point hitch 12 of the tractor. The hitch 14 allows for attachment of a rotationally selectable multi-purpose implement 10 to be attached directly behind the tiller 13. The multi-purpose implement 10 may be configured with a seeder 35 and a row implement 33. The farmer is able to save time spent in removing the tiller 13 from the tractor and then adding a seeder 35 or other implement, and then traversing the field a second time for seeding.

The tandem configuration permits the seeds get planted without the tractor re-compacting the freshly tilled soil caused by driving over it after it has been already been tilled. The seeder 35 is available to be used at any given time when the soil is ready to plant. Also, plants and seed can be planted in less than perfect conditions because the soil has been tilled without being packed down. This saves time, labor, and energy as well as being better for the cultivation of crops.

In the non-limiting embodiment shown, the multi-purpose implement 10 permits selection between a seeder 35 and a row-maker 33 that is built into the unit 10 allowing soil preparation for seed crops as well as plants, potatoes, and the like, that are not typically grown from seed planted in the prepared field. The tractor does not need to drive over the newly tilled soil to plant. The seeder 35 and row maker 33 are carried on a common support beam 30, or tool bar, that is rotatable about a longitudinal axis of the support beam 30 to readily reconfigure the multi-purpose apparatus 10 between a seeder 35 and a row maker 33. This also saves time because the operator does not need to detach the seeder 35 to then attach a row maker 33.

As seen in reference to the Figures, embodiments of the present invention may include a category 1, third, tandem link 16 that is configured to extend from an aft end of a tiller 13 to a front brace bar 18. A pair of upright brace bars 19 are arranged in an inverted Y, or wishbone shape, and are configured to directly bolt to lugs 17 mounted to an aft end of the tiller 13. An upper link 22, or connecting rod, attaches to a mount aperture on an upper end of the first brace bar 18 and an implement brace bar 20, which also has an inverted Y shape. A pair of category 1 lift arms 24 attach to interconnect the front 18 and implement brace bar 20 at the lower ends thereof to provide the tandem 3 point hitch interconnection with a mounting bracket 26 at a lower end of the rear upright brace bar 20. The mounting bracket 26 interconnects with the multipurpose implement 10.

A cylinder mount is provided at an upper end of each of the first brace bar 18 and the rear brace bar 20. A lift actuator 40 is also interconnected between the upper ends of each of the first brace bar 18 and the rear brace bar 20. A depth control chain 38 and bracket are provided to limit the travel of the apparatus 10 as it is lowered. A plurality of hoses and associated fittings are connectable to the hydraulic system of the tractor for operation of the lift actuator 42. The lift actuator 42 is operable to elevate the multipurpose implement 10 in a traveling, non-working position, and a lowered working position placing the selected implement in proximity to a ground surface, as limited by the depth control chain 38. The lift actuator 42 provides for independent elevational control of the multipurpose implement 10 from that of the tiller 13 to which it is attached in a tandem orientation.

A cross bar 36 is disposed between the lift arms 24. The cross bar 36 carries a cylinder mount. The cylinder mount provides for attachment of a forward end of a rotational actuator 42, such as a hydraulic cylinder to rotationally select a desired implement carried by the multipurpose implement 10. A plurality of hoses and associated fittings are connectable to the hydraulic system of the tractor for activation of the rotational actuator 42.

An aft end of the rotational actuator 42 is attached to a rotation bracket 28 that is coupled to an elongate tool bar 30. The rotation bracket 28 has rotation arm 46 radially extending from an outer surface of the rotation bracket 28. The rotation arm 46 is configured to rotate the tool bar 30 about its longitudinal length to selectively position one of the selected implements in a working position relative the ground surface. The rotation bracket 28 may include an indexing plate 44 having an arcuate slot and indexing pin 50 to guide rotation of the bracket 28. The arcuate slots define a fore and aft limit of rotation of the rotational bracket 28.

The tool bar 30 includes a plurality of implement mounting brackets 32 & 34 disposed in a spaced apart relation along a longitudinal length of the tool bar 30. The tool bar 30 is disposed transversely to a direction of travel of the tractor across the ground surface to be prepared. The implement mounting brackets 32 & 34 provide for an attachment of a selected implement to the tool bar 30. In the embodiment shown, a furrow mounting bracket 32 provides for attachment of a furrow head 33 to the tool bar 30. A seeder mounting bracket 34 provides for attachment of a seeder 35 to the tool bar 30.

Figure 3:
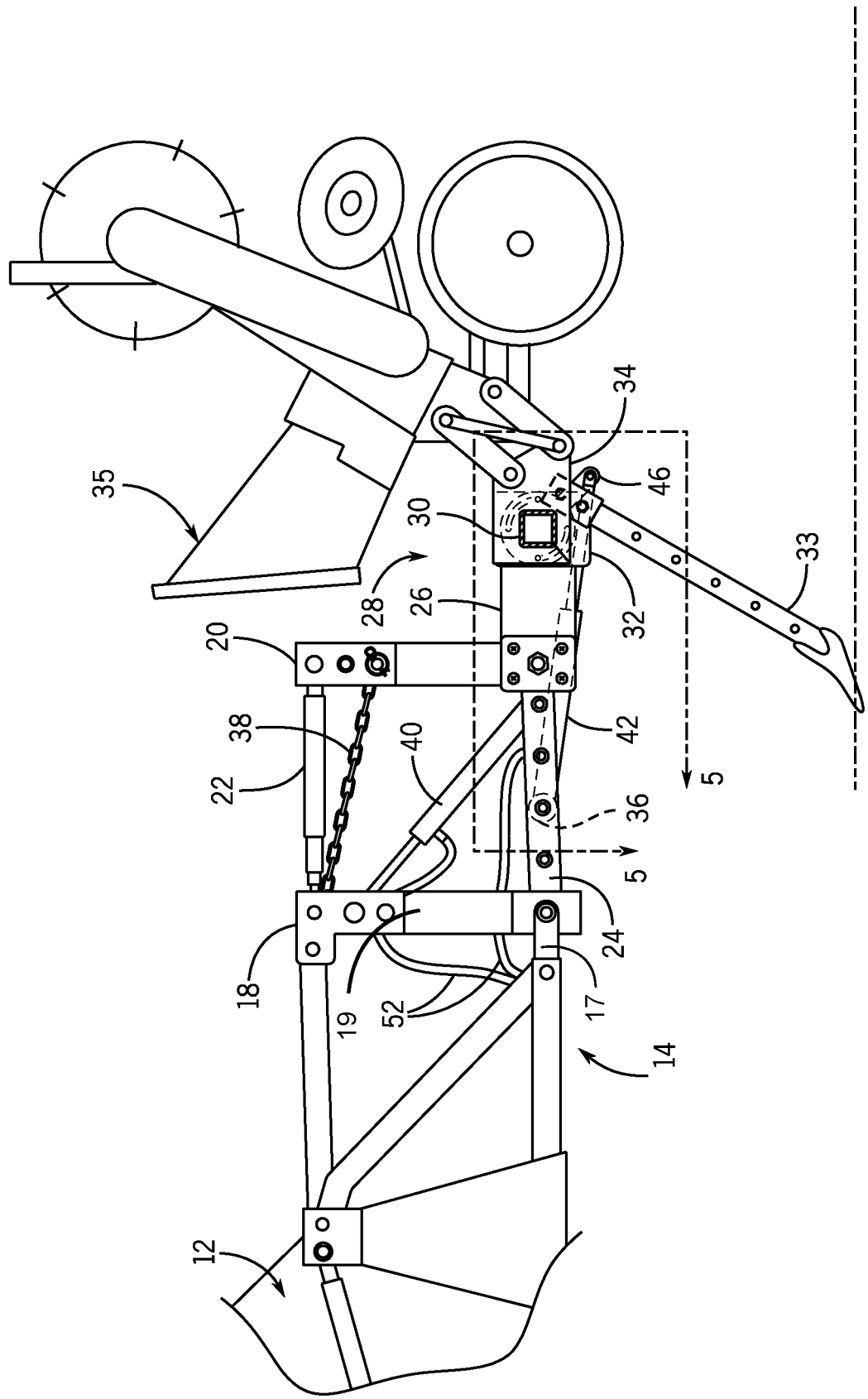
FIG. 3 is a side elevation view of the multipurpose agricultural implement with the furrowing heads in use.
Figure 4:
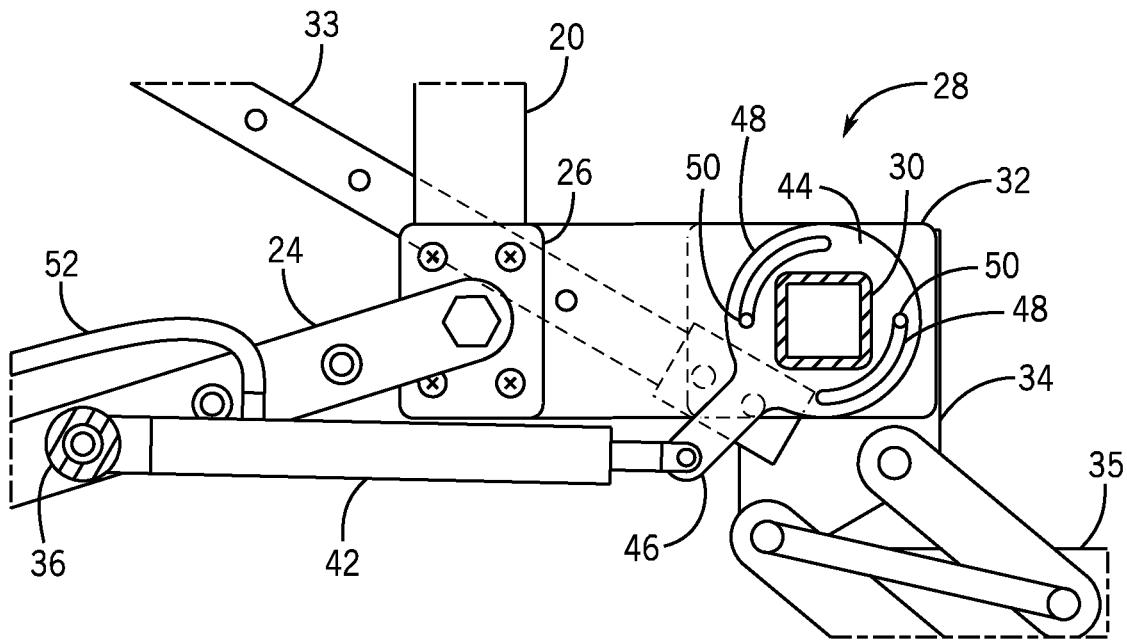
FIG. 4 is a detail elevation view indicated by line 4-4 of FIG. 2.
Figure 5:
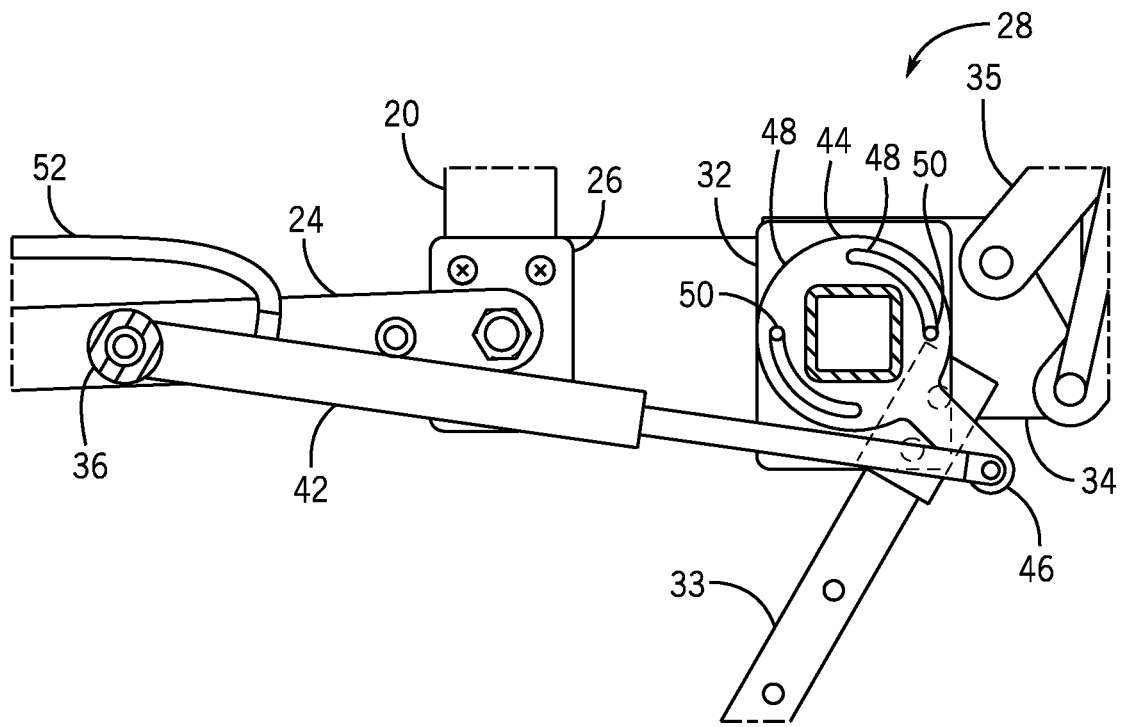
FIG. 5 is a detail elevation view indicated by line 5-5 of FIG. 3.

As best seen in reference to FIGS. 3-5, the crossbar 36 has a cylinder mount for attachment the forward end of the rotational cylinder 42. The cross bar 36 attaches to the lower lift arms 24, such as by a fastener or a weldment. The cross bar 36 may also serve as a sway bar. The rotational cylinder mount arm 46, which attaches to the tool bar 30 provides for rotation of the toolbar 30 about its longitudinal axis. The rotational cylinder 42 is operable to rotate the tool bar 30 for selection of one of the seeder 35 or the row maker 33.

As will be appreciated from the benefit of the present disclosure, in some aspects of the invention the components together create a tandem 3 point hitch mechanism that is directly mounted on the tiller 13 which serves as 2nd tractor mounting to permit a one pass coverage of the field. The seeder boxes 35 and/or row makers 33 are attached to the tool bar 30 of the multi-purpose implement 10. The settings for the tiller 13, the tool bar 30 and seed boxes 35 should be synchronized to insure proper seed depth created by the soil conditions and the tiller 13. When the settings are synchronized, the field ready and soil conditions are favorable, the operator is then equipped to till and plant with the seeder 35 or alternatively make rows with the row maker 33 in a single pass. It is recommended to do a trial run to fine tune settings and checking soil conditions.

The multi-purpose agricultural apparatus 10 may be raised and lowered independently of the position of the tiller 13 to which it is attached.

It should be understood, of course, that the foregoing relates to exemplary embodiments of the invention and that modifications may be made without departing from the spirit and scope of the invention as set forth in the following claims.

What is claimed is:

1. A multipurpose farm implement comprising:
an elongate tool bar having a longitudinal length that is disposed transversely to a direction of travel of the multipurpose farm implement across a ground surface;

a plurality of implement mounting brackets disposed in a spaced apart relation along the longitudinal length of the tool bar, including a forward mounting bracket adapted to receive a first implement and an aft mounting bracket adapted to receive a second implement;

a rotational bracket coupled to the tool bar, the rotational bracket configured to be coupled to a rotational actuator to rotate the elongate toolbar about the longitudinal length to selectively position one of the first implement or the second implement in a working position over the ground surface;

an implement brace bar formed in an inverted Y-shape; and a mounting bracket extending from a forward end of the tool bar, wherein lower ends of the implement brace bar attach to the mounting bracket.

2. The multipurpose farm implement of claim 1, wherein the second implement comprises a seeder.

3. The multipurpose farm implement of claim 1, further comprising:
a forward brace bar formed in an inverted Y-shape and configured to attach to a 3 point hitch;
a plurality of lower lift arms interconnecting a lower end of the forward brace bar and the lower end of the implement brace bar.

4. The multipurpose farm implement of claim 3, further comprising:
a connecting rod interconnecting an upper end of the forward brace bar and an upper end of the implement brace bar;
a lift actuator interconnected between an intermediate portion of the forward brace bar and an intermediate portion of the implement brace bar, wherein the lift actuator is operable to elevate the multipurpose farm implement to a non-working position and lower the multipurpose farm implement to a working position.

5. The multipurpose farm implement of claim 4, further comprising:
a depth control chain attached between the upper end of the forward brace bar and the intermediate portion of the implement brace bar, the depth control chain adjustably limiting the travel of the multipurpose farm implement-as it is lowered to the working position.

6. The multipurpose farm implement of claim 3 further comprising:
a cross bar extending between the plurality of lower lift arms;
a cylinder mount attached to the cross bar, the cylinder mount is attached to a forward end of the rotational actuator.

7. The multipurpose farm implement of claim 1, the rotational bracket further comprising:
a rotational cylinder mount arm radially extending from the rotational bracket, wherein an aft end of the rotational actuator is attached to the rotational cylinder mount arm.

8. The multipurpose farm implement of claim 7, further comprising:
an arcuate slot defined in a face of an indexing plate coupled to the rotational bracket; and
an index pin protruding within the arcuate slot, wherein the arcuate slot defines a clockwise rotational limit and a counter clockwise rotational limit of the multipurpose farm implement.

9. The multipurpose farm implement of claim 8, wherein the tool bar is rotationally carried in an aperture defined in the indexing plate.

10. The multipurpose farm implement of claim 1, further comprising:
a tiller,
a lug protruding from a lower end of the tiller, wherein the lower ends of a front brace bar are coupled to the lug;
a tandem link interconnecting a top end of the tiller and a top end of the front brace bar to couple the multipurpose farm implement to the tiller in a tandem three point hitch configuration.

11. A multipurpose farm implement comprising:
an elongate tool bar having a longitudinal length that is disposed transversely to a direction of travel of the multipurpose farm implement across a ground surface;
a plurality of implement mounting brackets disposed in a spaced apart relation along the longitudinal length of the tool bar, including a forward mounting bracket adapted to receive a first implement and an aft mounting bracket adapted to receive a second implement;
a rotational bracket coupled to the tool bar, the rotational bracket configured to be coupled to a rotational actuator to selectively position one of the first implement or the second implement in a working position over the ground surface;
an implement brace bar formed in an inverted Y-shape; and
a mounting bracket extending from a forward end of the tool bar, wherein lower ends of the implement brace bar attach to the mounting bracket.

12. The multipurpose farm implement of claim 11, further comprising:
a forward brace bar formed in an inverted Y-shape and configured to attach to a 3 point hitch;
a plurality of lower lift arms interconnecting a lower end of the forward brace bar and the lower end of the implement brace bar;
a connecting rod interconnecting an upper end of the forward brace bar and an upper end of the implement brace bar; and
a lift actuator interconnected between an intermediate portion of the forward brace and an intermediate portion of the implement brace bar, wherein the lift actuator is operable to elevate the multipurpose farm implement to a non-working position and lower the multipurpose farm implement to a working position.

13. The multipurpose farm implement of claim 12, further comprising:
a depth control chain attached between the upper end of the forward brace bar and the intermediate portion of the implement brace bar, the depth control chain adjustably limiting the travel of the multipurpose farm implement as it is lowered to the working position.

14. The multipurpose farm implement of claim 12 further comprising:
a cross bar extending between the plurality of lower lift arms interconnecting the lower end of the forward brace bar and the lower end of the implement brace bar;
a cylinder mount attached to the cross bar, the cylinder mount is attached to a forward end of the rotational actuator.

15. The multipurpose farm implement of claim 11, the rotational bracket further comprising:
a rotational cylinder mount arm radially extending from the rotational bracket, wherein an aft end of the rotational actuator is attached to the rotational cylinder mount arm.

16. The multipurpose farm implement of claim 11, further comprising:

an arcuate slot defined in a face of an indexing plate coupled to the rotational bracket; and an index pin protruding within the arcuate slot, wherein the arcuate slot defines a clockwise rotational limit and a counter clockwise rotational limit of the multipurpose farm implement.

17. The multipurpose farm implement of claim 16, wherein the tool bar is rotationally carried in an aperture defined in the indexing plate.

18. A multipurpose farm implement comprising:

an elongate tool bar having a longitudinal length that is disposed transversely to a direction of travel of the multipurpose farm implement across a ground surface;

a plurality of implement mounting brackets disposed in a spaced apart relation along the longitudinal length of the tool bar, including a forward mounting bracket adapted to receive a first implement and an aft mounting bracket adapted to receive a second implement;

a rotational bracket coupled to the tool bar, the rotational bracket configured to be coupled to a rotational actuator to selectively position one of the first implement or the second implement in a working position over the ground surface; and a rotational cylinder mount arm radially extending from the rotational bracket, wherein an aft end of the rotational actuator is attached to the rotational cylinder mount arm.

19. The multipurpose farm implement of claim 18, further comprising:

an arcuate slot defined in a face of an indexing plate coupled to the rotational bracket; and an index pin protruding within the arcuate slot, wherein the arcuate slot defines a clockwise rotational limit and a counterclockwise rotational limit of the multipurpose farm implement.

* * * * *